United States Patent
Li et al.

(10) Patent No.: US 8,415,843 B2
(45) Date of Patent: Apr. 9, 2013

(54) BRUSHLESS MOTOR

(75) Inventors: Yong Bin Li, Hong Kong (CN); Xin Ping Wang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 275 days.

(21) Appl. No.: 12/876,517

(22) Filed: Sep. 7, 2010

(65) Prior Publication Data
US 2011/0057523 A1    Mar. 10, 2011

(30) Foreign Application Priority Data
Sep. 7, 2009  (CN) .......... 2009 1 0190108

(51) Int. Cl.
*H02K 9/04*    (2006.01)
*H02K 9/06*    (2006.01)
*H02K 1/26*    (2006.01)

(52) U.S. Cl.
USPC ........... 310/60 A; 310/407; 310/413; 310/417

(58) Field of Classification Search .................. 310/58, 310/60 A, 64, 156.08, 156.21, 156.27–156.28, 310/400, 402, 405, 406, 407, 409, 413, 417
See application file for complete search history.

(56) References Cited

U.S. PATENT DOCUMENTS

| | | | | |
|---|---|---|---|---|
| 3,407,317 A * | 10/1968 | Honsinger | .................. | 310/58 |
| 3,456,141 A * | 7/1969 | Burgess | .................. | 310/114 |
| 3,663,127 A * | 5/1972 | Cheers | .................. | 417/372 |
| 4,755,699 A * | 7/1988 | Schmider | .................. | 310/68 R |
| 4,973,872 A * | 11/1990 | Dohogne | .................. | 310/156.28 |
| 5,140,210 A * | 8/1992 | Shirakawa | .................. | 310/156.28 |
| 5,359,248 A * | 10/1994 | Nagate et al. | .................. | 310/156.49 |
| 5,881,447 A * | 3/1999 | Molnar | .................. | 29/598 |
| 5,925,960 A * | 7/1999 | Hayes | .................. | 310/211 |
| 6,011,332 A * | 1/2000 | Umeda et al. | .................. | 310/58 |
| 6,324,745 B1 * | 12/2001 | Poag et al. | .................. | 29/598 |
| 7,462,964 B2 * | 12/2008 | Nagayama et al. | .................. | 310/58 |

FOREIGN PATENT DOCUMENTS

| | | |
|---|---|---|
| CN | 201113595 | 9/2008 |
| JP | 2007-174840 | 7/2007 |

\* cited by examiner

*Primary Examiner* — Tran Nguyen
(74) *Attorney, Agent, or Firm* — Muncy, Geissler, Olds & Lowe, PLLC

(57) ABSTRACT

A brushless motor comprises a stator and a rotor rotatably mounted to the stator. The rotor comprises a shaft, a rotor core fixed onto the shaft and magnets fixed to the rotor core. Two covers are fitted to respective ends of the rotor core, with one of the covers covering one end of the rotor core and at least a part of the radially outer peripheral surface of the rotor core, while the other cover at least covering the other end of the rotor core. Preferably, the entire peripheral surface of the rotor core is substantially covered by the two covers and the gap between the two covers is sealed by adhesive.

14 Claims, 6 Drawing Sheets

US 8,415,843 B2

BRUSHLESS MOTOR

CROSS REFERENCE TO RELATED APPLICATIONS

This non-provisional patent application claims priority under 35 U.S.C. §119(a) from Patent Application No. 200910190108.0 filed in The People's Republic of China on Sep. 7, 2009.

FIELD OF THE INVENTION

This invention relates to a brushless motor and in particular, to a micro brushless motor. The term "micro brushless motor" as used in this specification and appended claims is intended to refer to a brushless motor that has a small size and has a power range from a few watts to a several hundred watts.

BACKGROUND OF THE INVENTION

A rotor of a traditional brushless motor is illustrated in FIG. 11. The rotor 20 comprises a shaft 21, a rotor core fixed onto the shaft 21, magnets 23 mounted to a radially outer surface of the rotor core, and a keeper ring 26 to retain the magnets 23 on the rotor core against centrifugal force. The keeper ring 26 is usually made of stainless steel and has to be very thin, for example less than 0.2 mm thickness, or else the performance of the motor will be significantly decreased. Therefore tooling is needed, tolerance control must be strict, and the production cost is high.

Additional metal discs 24 and 25 are provided on each end of the rotor core, and the rotor is balanced by drilling holes 27 in the discs. The discs are usually made of copper which is expensive.

There is a desire for a lower cost micro brushless motor which is at least just as reliable.

SUMMARY OF THE INVENTION

Accordingly, in one aspect thereof, the present invention provides a brushless motor comprising: a stator and a rotor rotatably mounted to the stator, the rotor comprises a shaft, a rotor core fixed onto the shaft, and magnets fixed to the rotor core; two covers fitted to respective ends of the rotor core, one of the two covers covering one end of the rotor core and at least a part of the radially outer peripheral surface of the rotor core, the other one of the two covers at least covering the other end of the rotor core.

Preferably, a plurality of axially extending grooves are formed in the radially outer peripheral surface of the rotor core, and a plurality of anchors are formed on an inner surface of the two covers and engage the grooves.

Preferably, the magnets are mounted to the peripheral surface of the rotor core, and each groove being arranged respectively between two adjacent magnets.

Preferably, a plurality of axially extending ridges are formed on the peripheral surface of the rotor core, each ridge being arranged respectively between two adjacent magnets.

Preferably, the two covers tightly engage the shaft, and the entire peripheral surface of the rotor core is substantially covered by the two covers and the interface between the two covers is sealed by adhesive.

Preferably, each cover has an opposing face forming the interface between the covers and the opposing faces have a surface inclined to the axial direction of the shaft to increase the contact surface for the adhesive seal.

Preferably, a locking mechanism is formed between the two covers to lock the two covers together.

Preferably, the stator comprises a housing and a stator core fixed to the housing, and a plurality of openings are formed in two ends of the housing; a plurality of fins are formed in at least one of the covers to generate air flow when the rotor is rotating and the air flow flows along an air passage which comprises the openings formed in one end of the housing, gaps inside the motor and the openings formed in the other end of the housing.

Preferably, a ring is integrally formed with the fins.

Preferably, the stator core comprises a yoke, a plurality of teeth extending inwardly from the yoke, and stator windings wound about the teeth; and the air passage includes the gaps between the field windings.

Preferably, at least one balance member is fixed to the fins to balance the rotor.

Alternatively, a plurality of holes are formed in the two covers and balance members are fitted to the holes to balance the rotor.

BRIEF DESCRIPTION OF THE DRAWINGS

Preferred embodiments of the present invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
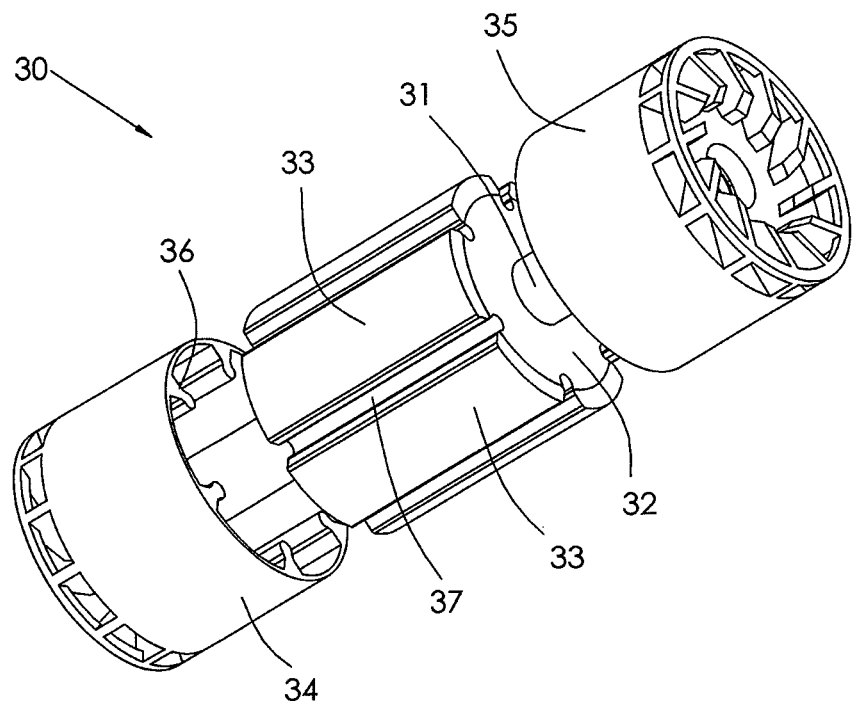
FIG. 1 is an exploded view of a rotor of a micro brushless motor according to a first preferred embodiment of the present invention.
Figure 2:
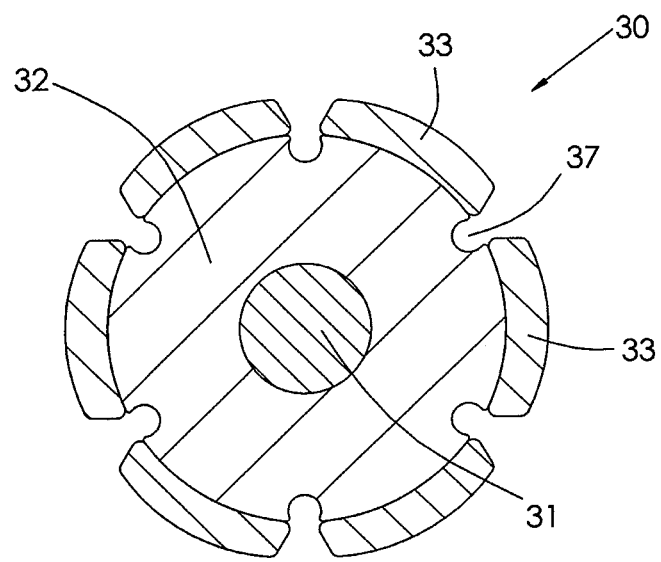
FIG. 2 is a cross sectional view of the rotor of FIG. 1.
Figure 3:
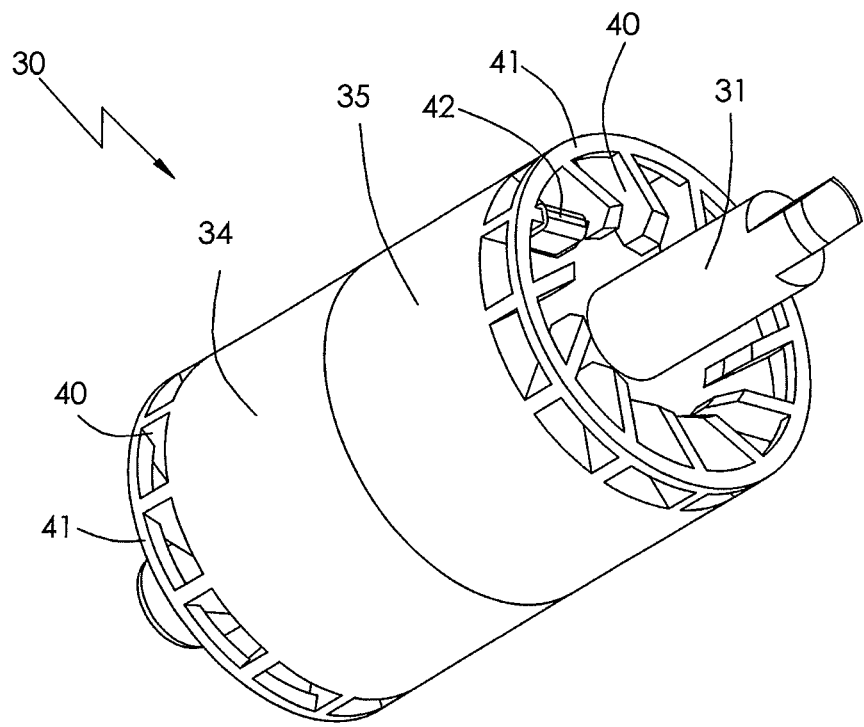
FIG. 3 is an isometric view of the rotor of FIG. 1.

FIGS. 1 to 10 illustrate preferred embodiments of the present invention. FIG. 1 and FIG. 3 illustrate a rotor according to a first embodiment, and FIG. 2 illustrates a cross section of the rotor.

The rotor comprises a shaft 31, a rotor core 32 fixed to the shaft 31, a plurality of magnets 33 mounted on the rotor core 32. Two plastic covers 34, 35 are press fitted to respective ends of the rotor core 32. In this embodiment, the magnets 33 are mounted to a radially outer peripheral surface of the rotor core by adhesive and the magnets 33 are arranged circumferentially about the rotor. A plurality of axially extending grooves 37 are formed in the surface of the rotor core 32 and each groove 37 is arranged between two adjacent magnets 33. That is, the magnets 33 and the grooves 37 are arranged alternately. Every two adjacent grooves 37 define an area where one of the magnets 33 is mounted. The grooves 37 are also used to engage the two covers 34 and 35 as will be described latter.

A plurality of anchors 36 are formed on an inner surface of the two covers 34, 35. When the covers are being mounted to the rotor core 32, the anchors 36 are firstly aligned with corresponding grooves 37, and then the covers are pressed on to the rotor core 32. The cover 34 covers one end of the rotor core 32 and a part of the peripheral surface of the rotor core 32. Similarly, the cover 35 covers the other end of the rotor core 32 and the other part of the peripheral surface of the rotor core 32. The grooves 37 may be filled with adhesive in advance to make sure that the covers 34, 35 are firmly secured to the rotor core 32.

As shown in FIG. 3, the covers 34, 35 are press fitted to the rotor core 32 and shaft 31 and the entire peripheral surface of the rotor core is substantially covered by the two covers. The interface between the two covers 34, 35 may be sealed by adhesive so that the rotor core 32 and magnets 33 are isolated and there is no risk of rust developing on the rotor core or magnets. The covers 34, 35 are preferably molded from an antirust plastics material, such as PPS (Polyphenylene Sulfide) or POM (polyformaldehyde). The magnets 33 are preferably rare earth magnets. The covers 34, 35 preferably have identical structures.

In this embodiment, a plurality of fins 40 are formed on the ends of each of the two covers 34, 35 and arranged around the shaft 31. While each fin 40 may extend in a radial direction of the rotor, the fins optionally may extend in a direction that is offset from the radial direction of the rotor, for example, offset from the radial direction in a clockwise direction. This is useful for motors which operate predominantly in one direction. Optionally, each fin 40 may be tilted to the axial direction of the rotor. Air flow will be generated by the fins when the rotor rotates. The air flow will be routed in an air passage from one end of the motor to the other end of motor to cool the motor. The air passage will be further described hereafter. In addition, balance members 42 can be mounted to the fins to balance the rotor. The balance member 42 may be in the form of a metal clip, as shown in FIG. 3. Compared with the traditional balancing method of drilling holes in the rotor, mounting balance members according to the present invention is easier.

In order to increase the mechanical strength of the fins 40, a ring 41 is integrally formed with the fins 40. Preferably, the ring 41 is formed at the radially outer ends of the fins 40 to prevent the mounted balance members 42 slipping off the fins under the influence of centrifugal force.

Figure 4:
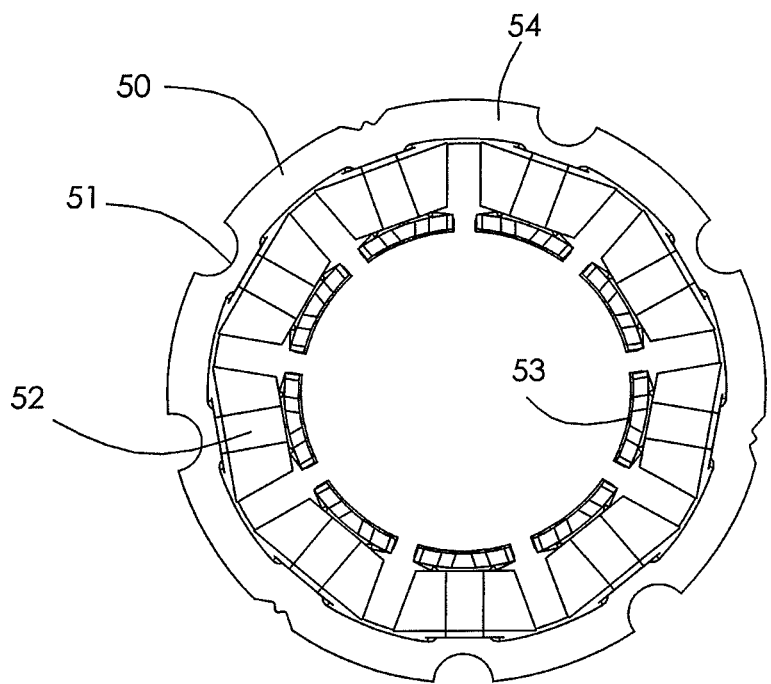
FIG. 4 illustrates a stator of a micro brushless motor.

FIG. 4 illustrates a stator core 50 of the micro brushless motor. The stator core 50 has an annular yoke 54 with a plurality of teeth 53 extending radially inward from the yoke to form the stator poles. Stator windings 52 are wound about the teeth 53. A plurality of axially extending grooves 51 are formed in the radially outer surface of the stator core 50 to aid cooling of the stator by providing an air pathway.

Figure 5:
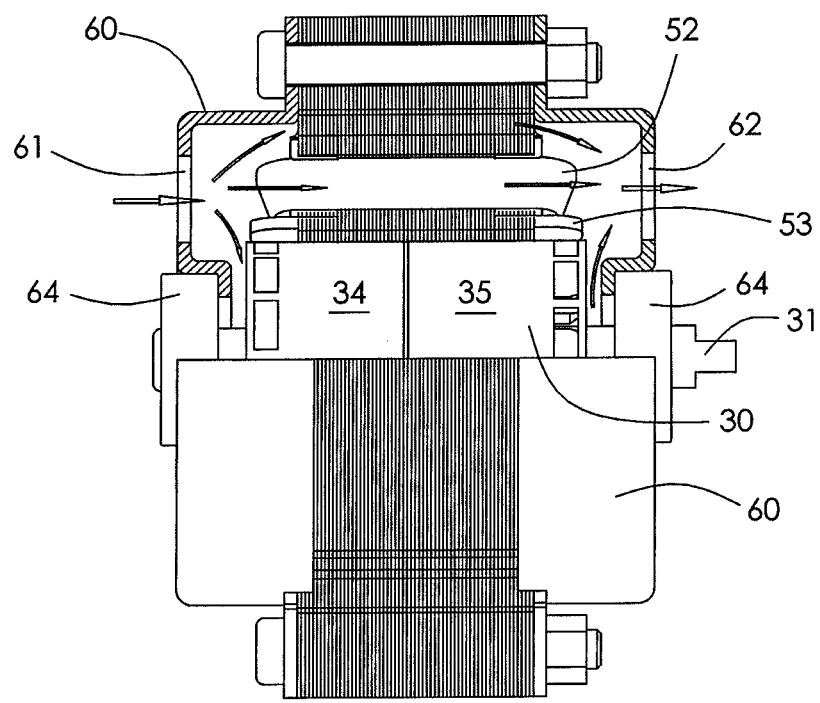
FIG. 5 is a partial sectional view of the assembled micro brushless motor incorporating the rotor of FIG. 1 and the stator of FIG. 4.

FIG. 5 illustrates the assembled motor with a part of the motor housing sectioned to expose the stator and rotor. The stator comprises a housing, the stator core 50 fixed to the housing and field windings 52 wound about teeth 53 of the stator core. The housing is shown as having two bearing brackets or end caps 60 bolted to extensions of the stator core (not shown in FIG. 4). Alternatively, the housing may be a deep drawn cup or similar into which the stator core is pressed or otherwise secured. The rotor is journalled in bearings 64 supported by the housing. A plurality of openings 61 and 62 are formed in the respective ends of the housing. When the rotor is rotating, air is sucked by fins 40 formed on cover 34 into the motor from the openings 61 formed in one end cap and then blown out of the motor via openings 62 formed in the other end cap by fins formed on cover 35. That is, the air passage through the motor comprises the openings 61, gaps inside the motor, and the openings 62.

The air passage comprises the gaps between field windings 52, so that the heat generated by the field windings 52 and/or teeth 53 will be dissipated in the air flow. In addition, air may flow along the plurality of grooves 51 formed in the stator core 50. Thus the grooves 51 are a part of the air passage.

Figure 11:
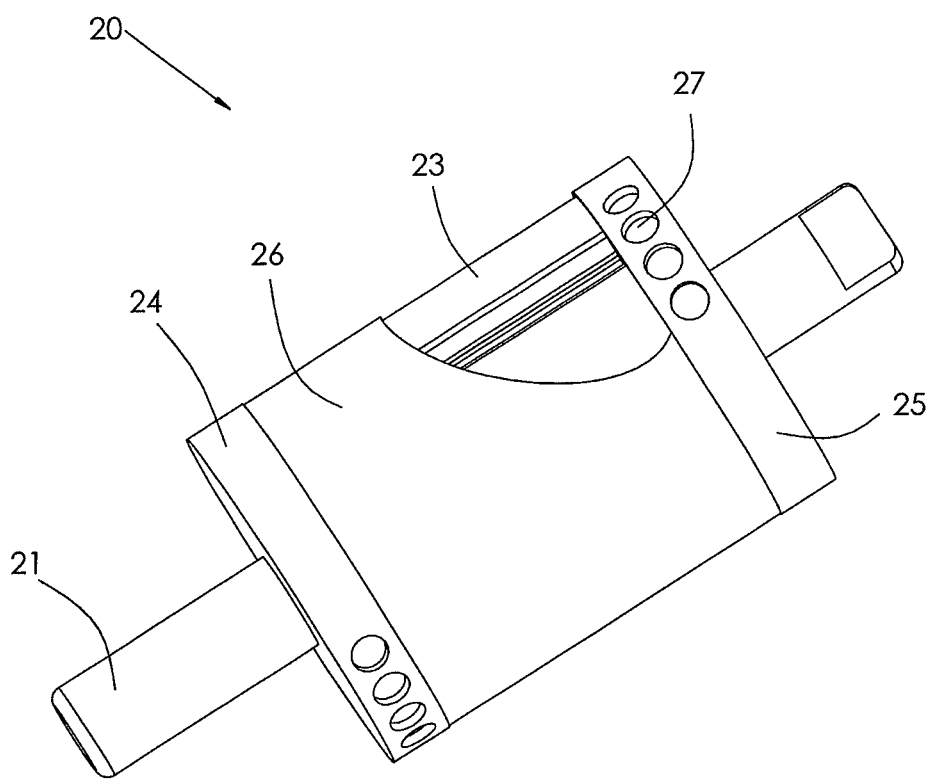
FIG. 11 is a rotor of a traditional micro brushless motor.

Compared with a traditional brushless motor as shown in FIG. 11, the brushless motors according to the preferred embodiments do not required a stainless keeper ring and metal covers so that the cost is reduced. In addition, the brushless motor according to the preferred embodiment has a simple structure.

Figure 6:
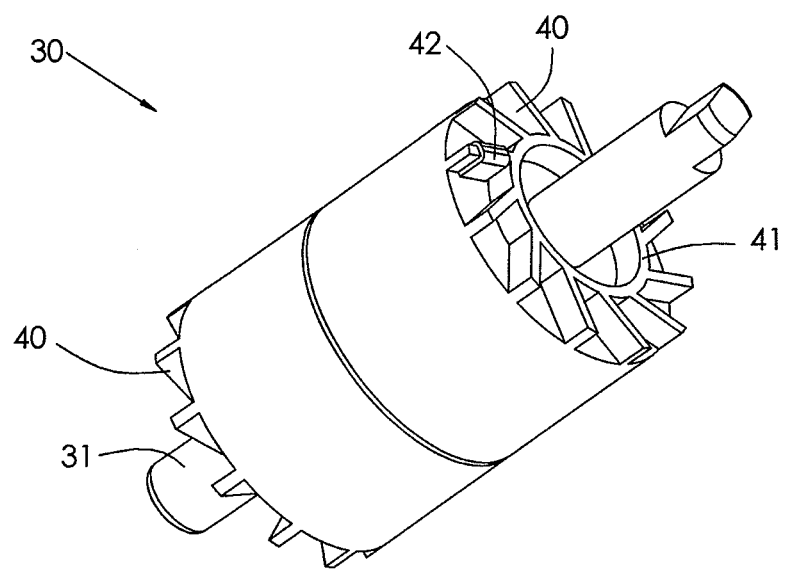
FIG. 6 illustrates a rotor for a brushless motor according to a second embodiment of the present invention.

FIG. 6 illustrates a rotor of a brushless motor according to a second embodiment of the present invention. The main difference between the rotor shown in FIG. 3 and the rotor shown in FIG. 6 is that, in this embodiment, the ring 41 integrally formed with the fins 40 is arranged at the radially inner ends of the fins 40. It will be easier to mold this cover since the ring 41 located at the radially inner ends of the fins 40 does not require the windows between the fins and the ring for the passage of air.

Figure 7:
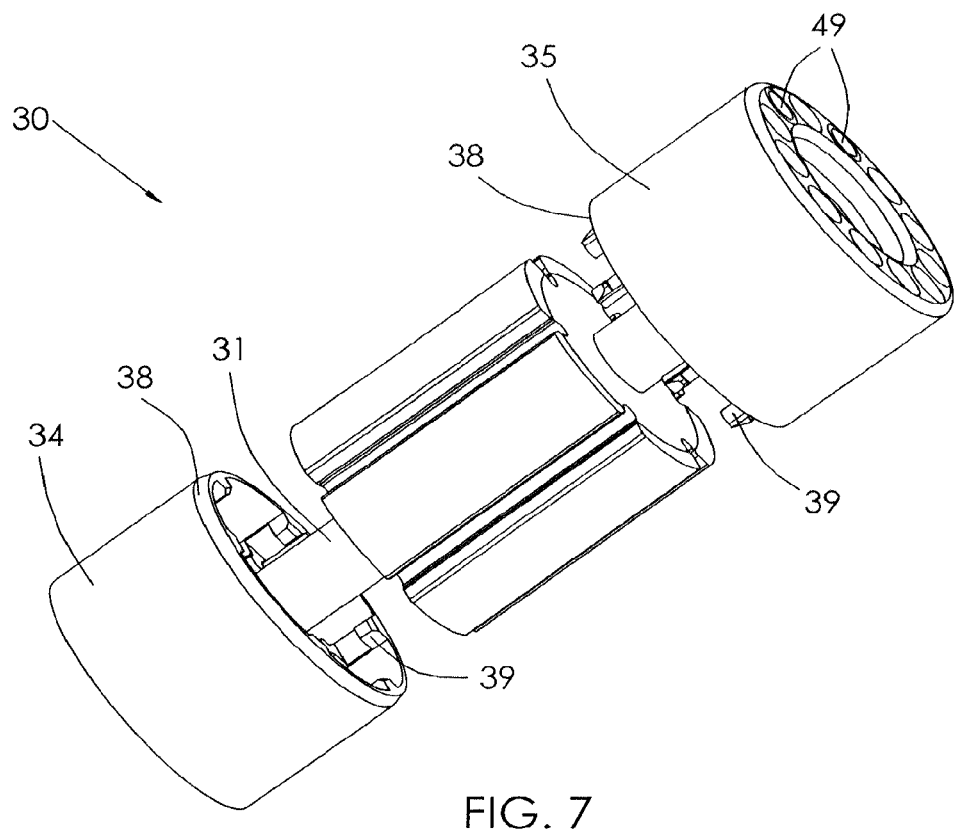
FIG. 7 is an exploded view of a rotor for a brushless motor according to a third embodiment of the present invention.

FIG. 7 is an exploded view of a rotor of a brushless motor according to a third embodiment of the present invention. The brushless motor is preferably used in a fuel pump.

Figure 8:
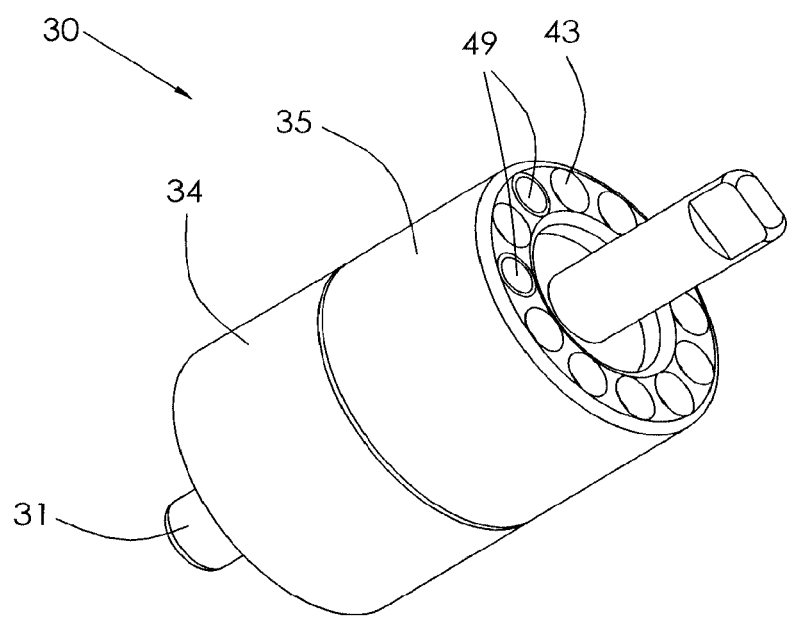
FIG. 8 is an assembled view of the rotor of FIG. 7.

FIG. 8 is a view of the assembled rotor. A plurality of holes 43, instead of the fins and ring, are formed in the two covers 34, 35. The holes 43 are formed when the covers are molded. Balance members 49 can be fitted to the holes 43 to balance the rotor. A locking mechanism 39 is formed in the two covers 34, 35 to lock the two covers together. In this embodiment, the locking mechanism 39 comprises a locking member formed in one cover 34, and engaging a locking member formed in the other cover 35 to hold the two covers together when the two covers are fitted to the rotor core 32. Each of the locking members have a rearward facing shoulder and at least one of the locking members of each pair of opposing locking members has an axially extending tongue-like projection having an enlarged end forming the shoulder. In the engaged position the two shoulders abut to prevent separation of the covers. The locking members are integrally formed with the covers. Gaps between opposing faces 38 of the two covers may be sealed by adhesive. Preferably, the opposing faces 38 are beveled or inclined to the axial direction to enlarge the contact surface for the adhesive.

Figure 9:
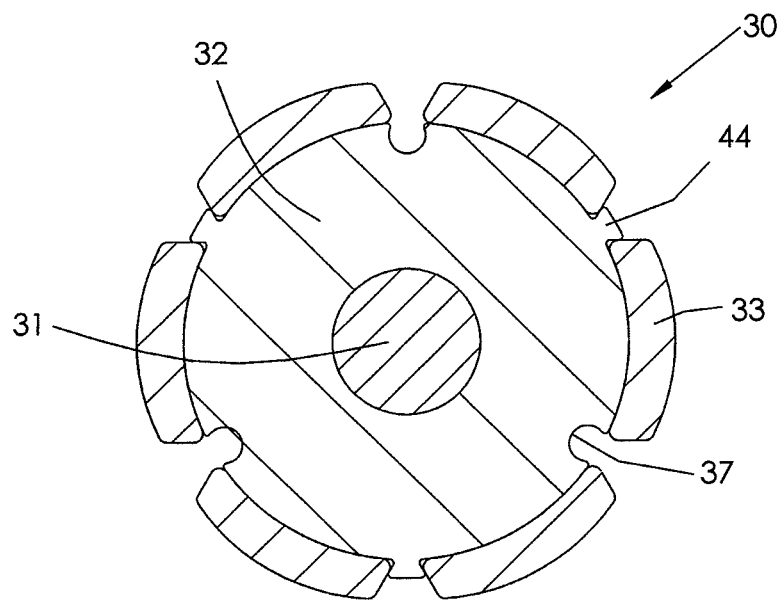
FIG. 9 is a cross sectional view of a rotor of a micro brushless motor according to a fourth embodiment of the present invention.

FIG. 9 illustrates a cross section of a rotor of a brushless motor according to a fourth embodiment of the present invention. The main difference between the rotor shown in FIG. 9 and the rotor shown in FIG. 2 is that, in this embodiment, a plurality of grooves 37, and a plurality of ridges 44 are formed at the radially outer peripheral surface of the rotor core 32. The grooves 37 and the ridges 44 are alternately arranged. Each of the ridges 44 extends axially and is used as a separator between two adjacent magnets 33. That is, each ridge 44 and one of its adjacent grooves 37 define an area where a magnet 33 is mounted.

Figure 10:
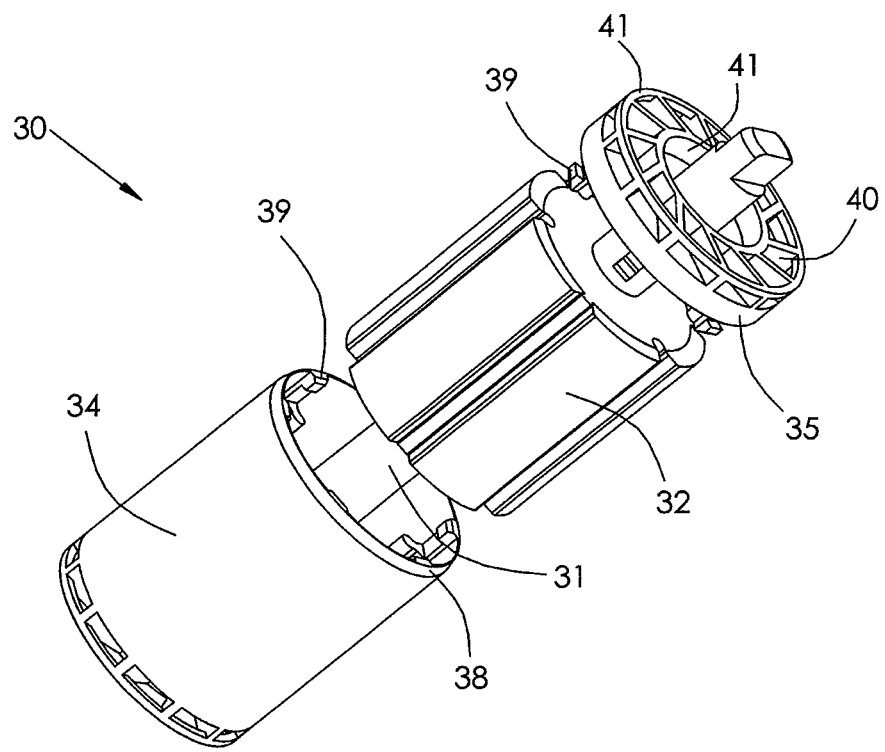
FIG. 10 is an exploded view of a rotor of a brushless motor according to a fifth embodiment of the present invention.

FIG. 10 illustrates another rotor of a brushless motor according to a fifth embodiment of the present invention. The main difference between the rotor shown in FIG. 1 and the rotor shown in FIG. 10 is that, in this embodiment, cover 34 has a larger axial length than that of cover 35. Cover 34 covers one end of the rotor core 32 and the entire peripheral surface of the rotor core 32, while cover 35 covers only the other end of the rotor core 32. Two rings 41 respectively joining together the radially inner ends and the radially outer ends of the fins 40, are integrally formed with each cover. For example, in cover 35, one ring 41 is integrally formed with the radially inner ends of the fins, and the other ring 41 is integrally formed with the radially outer ends of the fins.

As an alternative embodiment, the two covers 34 and 35 of the rotor as shown in FIG. 3, FIG. 6 or FIG. 8 can have different axial lengths.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A micro brushless motor comprising: a stator and a rotor rotatably mounted to the stator, wherein the stator comprises a housing, a stator core fixed to the housing, and a plurality of openings formed in two ends of the housing; the rotor comprises a shaft, a rotor core fixed onto the shaft, and magnets fixed to the rotor core,
   two plastic covers fitted to respective ends of the rotor core, one of the two covers covering one end of the rotor core and at least a part of the radially outer peripheral surface of the rotor core, the other one of the two covers at least covering the other end of the rotor core;
   wherein a plurality of fins are integrally formed in at least one of the covers to generate air flow when the rotor is rotating and the air flow flows along an air passage which comprises the openings formed in one end of the housing, gaps inside the motor and the openings formed in the other end of the housing.

2. The brushless motor of claim 1, wherein a plurality of axially extending grooves are formed in the radially outer peripheral surface of the rotor core, and a plurality of anchors are formed on an inner surface of the two covers and engage the grooves.

3. The brushless motor of claim 2, wherein the magnets are mounted to the peripheral surface of the rotor core, and each groove being arranged respectively between two adjacent magnets.

4. The brushless motor of claim 3, wherein a plurality of axially extending ridges are formed on the peripheral surface of the rotor core, each ridge being arranged respectively between two adjacent magnets.

5. The brushless motor of claim 2, wherein the two covers tightly engage the shaft, and the entire peripheral surface of the rotor core is substantially covered by the two covers and an interface between the two covers is sealed by adhesive.

6. The brushless motor of claim 5, wherein each cover has an opposing face forming the interface between the covers and the opposing faces have a surface inclined to the axial direction of the shaft to increase the contact surface for the adhesive seal.

7. The brushless motor of claim 1, wherein a locking mechanism is formed between the two covers to lock the two covers together.

8. The brushless motor of claim 1, wherein a ring is integrally formed with the fins.

9. The brushless motor of claim 1, wherein:
   the stator core comprises a yoke, a plurality of teeth extending inwardly from the yoke, and stator windings wound about the teeth;
   the air passage includes the gaps between the field windings.

10. The brushless motor of claim 1, wherein at least one balance member is fixed to at least one of the fins to balance the rotor.

11. The brushless motor of claim 8, wherein the ring is formed at the radially inner ends of the fins and is arranged extending along the axial direction of the motor.

12. The brushless motor of claim 10, wherein a ring is integrally formed at the radially outer ends of the fins.

13. The brushless motor of claim 10, wherein each balance member is a U-shaped clip clipped to a corresponding fin of the rotor.

14. A micro brushless motor comprising: a stator and a rotor rotatably mounted to the stator, the rotor comprises a shaft, a rotor core fixed onto the shaft, and magnets fixed to the rotor core,
   two covers fitted to respective ends of the rotor core, one of the two covers covering one end of the rotor core and at least a part of the radially outer peripheral surface of the rotor core, the other one of the two covers at least covering the other end of the rotor core; wherein a plurality of holes are formed in the two covers and at least one balance member is fitted to at least one of the holes to balance the rotor.

* * * * *